United States Patent [19]

Wong

[11] 4,384,065
[45] * May 17, 1983

[54] HIGH GLOSS WATER-BASE COATING COMPOSITION

[76] Inventor: Jack Y. Wong, 26333 Aric La., Los Altos Hills, Calif. 94022

[ * ] Notice: The portion of the term of this patent subsequent to Jun. 15, 1999, has been disclaimed.

[21] Appl. No.: 386,746

[22] Filed: Jun. 9, 1982

Related U.S. Application Data

[63] Continuation-in-part of Ser. No. 190,604, Sep. 25, 1980, Pat. No. 4,335,163.

[51] Int. Cl.$^3$ .................... B05D 5/00; C09D 3/64; C09D 11/06; C09D 11/10
[52] U.S. Cl. ..................................... 524/322; 106/28; 106/253; 106/264; 260/DIG. 38; 427/256; 427/282; 427/421; 524/376; 524/378; 524/389
[58] Field of Search ............... 524/376, 378, 389, 322; 427/282, 421, 256; 106/28, 253, 264; 260/DIG. 38

[56] References Cited

U.S. PATENT DOCUMENTS

| | | |
|---|---|---|
| 2,651,871 | 9/1953 | Lynden . |
| 3,468,694 | 9/1969 | Moritz et al. . |
| 4,116,903 | 9/1978 | Lietz et al. . |
| 4,125,499 | 11/1978 | Howard . |
| 4,225,477 | 9/1980 | Vasishth et al. . |
| 4,335,163 | 6/1982 | Wong ................... 427/256 |

*Primary Examiner*—Ronald W. Griffin
*Attorney, Agent, or Firm*—Limbach, Limbach & Sutton

[57] ABSTRACT

A high gloss water-base coating composition suitable for exterior and interior paint and screen printing ink. Such composition comprises water; at least two vinyltoluene co-polymers containing safflower oil fatty acid, isophthalic acid polyester and trimellitic acid; a basic solution having a pH of 7.8 to 10.5; two co-solvents; water soluble drying agents; and pigments.

46 Claims, No Drawings

HIGH GLOSS WATER-BASE COATING COMPOSITION

BACKGROUND OF THE INVENTION

This is a continuation-in-part of patent application, Ser. No. 190,604, filled Sept. 25, 1980, which now bears U.S. Pat. No. 4,335,163.

This invention relates to an improved water-base coating composition which on application provides a high gloss enamel finish. The composition is ideally suited as an exterior high gloss paint, especially for commercial sign painting. The composition may also be used with slight modification as a screen printing ink, especially for textile application.

Water-base coating compositions, such as latexes, acrylics, epoxides, and vinyl resins, are well known in the art. These coatings are highly desirable for a number of reasons, especially the facile manner in which they may be thinned or cleaned up during application. However, the water-base coatings have previously been unsuitable for either commercial sign painting or as high gloss inks for screen printing for a number of reasons.

Commercial sign painting requires a coating which dries as a very high gloss enamel. Previously, water-base paints have only been able to attain, at best, a semi-gloss dried finish.

Commercial sign paint must have greater durability and resistance to sun fading than paints for other uses. It must also be rapid drying.

Therefore, to meet the requirements of high gloss, durability and strong adhesion, oil-base enamels and screen printing inks containing organic and petroleum solvents have been the only feasible choices.

The oil-base "bulletin enamel" or sign paint which contains 28-50% organic or petroleum solvents and the oil-base screen printing inks which may contain up to 38% organic or petroleum solvents, have many disadvantages including flammability, toxicity, air polluting tendencies, increasing scarcity and expensiveness. Furthermore, oil-base screen printing requires great amounts of organic or petroleum solvents for clean-up of the silk screen and other printing machinery.

The previously known water-base screen printing inks provided a flat or semi-gloss finish which was not as hard and durable as a high gloss finish. High gloss required oil-base inks.

OBJECTS OF THE INVENTION

It is an object of this invention to provide a water-base coating composition having an extremely high gloss enamel finish.

It is another object of this invention to provide a highly durable coating.

It is another object of this invention to provide an easily applied coating.

It is another object of this invention to provide a fast drying coating for sign painting.

It is another object of this invention to provide a non-flammable coating.

It is another object of this invention to provide a non-toxic and non-polluting coating.

It is another object of this invention to provide a coating which is water soluble prior to drying.

It is another object of this invention to provide a coating having a long, stable shelf-life in which viscosity remains constant so that drying time does not increase.

It is a further object of the invention to provide a coating suitable as a high gloss screen printing ink.

SUMMARY OF THE INVENTION

In furtherance of the above recited objects, an improved coating composition has been discovered comprising:

(a) 20% to 65% by weight water;

(b) 20% to 75% by weight of at least two vinyltoluene co-polymers containing safflower oil fatty acid, isophthalic acid polyester and trimellitic acid;

(c) 1 to 10% by weight of a basic solution having a pH of 7.8 to 10.5;

(d) 0.5 to 5% by weight co-solvent A which is selected from the group consisting of isopropyl alcohol, butanol and glycol ether;

(e) 0.5% to 5% by weight co-solvent B which is a different glycol ether;

(f) 0.1 to 1.6% by weight water soluble drying agents; and (g) pigments.

Within these possible ranges, the preferred ranges are as follows:

(a) 28 to 35% by weight water;

(b) 28 to 35% by weight of at least two vinyltoluene co-polymers containing safflower oil fatty acid, isophthalic acid polyester and trimellitic acid;

(c) 2.5 to 5.5% by weight of a basic solution having a pH of 8.0 to 8.5;

(d) 1.5% to 2.5% by weight co-solvent A which is selected from the group consisting of isopropyl alcohol, butanol and glycol ether;

(e) 1.5% to 2.5% by weight co-solvent B which is a different glycol ether;

(f) 0.75 to 1.5% by weight water soluble drying agents; and (g) pigments.

The composition of this invention can be converted to a suitable screen printing ink by adding to the above preferred formula, a water reducible thickening agent in the amount of 1 to 5% by weight and preferably 1.8 to 2.5% by weight.

DETAILED DESCRIPTION

The composition of the invention contains approximately 10 to 38% and preferably 14 to 18% each of two water reducible alkyd resin binders. The exact weight percentage of each alkyd is dependent upon the desired pigmentation. Generally, the ratio is approximately 1:1. Since pigments oxidize at different rates and have different oil absorption rates, the ratio of alkyds may need to be adjusted to control drying time and the desired viscosity for brushing consistency. The ratio of alkyd resin to water is generally 1:1 by weight.

It has been discovered that better stability and longer "shelf-life" of the formulated product are obtained when the two alkyd resins have similar chemical structures or are within the same chemical family. The use of alkyd resins having greatly different chemical structures may produce the desirable high gloss and durability characteristics, but the formulated product will not be as physically and chemically stable.

The added stability reduces or eliminates the likelihood that the formulated product will become increasingly viscous with age, thereby necessitating a longer drying time following application of the product.

The added stability of the composition also eliminates the need for defoamers to suppress foam and bubbles previously found in water-base alkyd compositions.

The alkyd resins of this composition are both vinyltoluene co-polymers containing safflower oil fatty acid, isophthalic acid polyester and trimellitic acid.

The structure of one of the alkyd resins has a very short carbon chain. This alkyd provides the composition with a high gloss not previously found in water base paints. This alkyl also provides rapid drying and a hard coating having excellent water resistance and scrubability.

The structure of the other alkyd has a long carbon chain and the alkyd has a relatively high molecular weight. This adds body to the coating, thus preventing "sagging" and "bleeding" of the paint. Additionally, it provides the coating with a smooth brushing consistency and adds to the gloss. These are important characteristics particularly when used for sign and lettering paint.

Gloss may be measured by taking readings of a painted surface at 60 degree angles with an instrument such as the Gloss Gard Digital Gloss Meter, GG7360, Ser. No. 2040, manufactured by Gardner Co. The following are examples of the gloss readings of various types of paint.

TABLE I

| Type Paint | Average Gloss Reading |
|---|---|
| Flat latex | 0 |
| Semi-gloss water-base | 25–40 |
| Other high gloss water-base | 50–75 |
| High gloss oil base sign | 75–85 |
| Ryan 100 Line Oil-base Bulletin Enamels | 83–89 |
| Water Base Test Paint | 93–101 |

The acidic alkyds are converted to readily soluble alkali amides by the addition of a basic solution. Suitable bases include, for example, 29% aqua ammonia, sodium hydroxide, triethylamine, and other organic amines. A pH in the range of 7.8 to 10.5 and preferably 8.0 to 8.5 results in the desired water solubility of the composition. Generally, 1 to 10% and preferably 2.5 to 5.5% by weight of base is required to neutralize the alkyds and obtain a slightly basic solution.

Two co-solvents are added to the composition. Co-solvent A may be selected from the group consisting of isopropyl alcohol, butanol, and glycol ethers, such as ethylene glycol monobutyl ether, ethylene glycol monopropyl ether and ethylene glycol monoethyl ether. This solvent provides brushing consistency and smoothness in application. It also acts as a wetting agent to ensure that all the components of the composition remain in solution. Along with the driers it facilitates drying.

Co-solvent B is a glycol ether, preferably propylene glycol monopropyl ether. It is added to the composition to enhance stability, particularly the shelf-life of the formulated composition because it maintains the pH at the desired level for long periods of time.

Generally, co-solvent A and B each comprise approximately 0.5 to 5% and preferably 1.5 to 2.5% by weight of the coating composition.

To ensure drying both above and below the surface water soluble drying agents comprising 0.1 to 1.6%, but preferably 0.75 to 1.5%, by weight of the composition are used. The surface drying agent is a cobalt water base drier. Below surface drying is facilitated by the use of manganese, zirconium and calcium compositions.

The ratio of driers is not critical but the following are possible ratios of commercially available driers:

(a) Cobalt Hydro-Cure[1] Manganese Hydro-Cure in a 1:4 weight ratio.

(b) Cobalt Hydro-Cure: Manganese Hydro-Cure: Zirconium Hydro-Cem in a 1:2:1 weight ratio.

(c) Cobalt Hydro-Cure II: Calcium Hydro-Cem: Zirconium Hydro-Cem in a 1:3:1.5 weight ratio.

[1] "Hydro-Cure" and "Hydro-Cem" are the trademarks of Mooney Chemicals, Inc.

In a 100 gallon batch of the composition of this invention the following combination of drying agents was successfully used: 1.89 pounds (lb.) of cobalt Hydro-Cure II; 5.68 lb. of 5% Calcium Hydro-Cem; and 2.84 lb. of 12% zirconium Hydro-Cem.

When the composition of this invention is prepared for use as a screen printing ink, the viscosity must be at least 95 and preferably 140 Krebs Units[2] ("K.U.") so that the printed images will not run or smear.

[2] A Krebs Unit, measured by a Stormer Viscometer measures resistance to brushing: 49 K.U.=200 centipoise and 114 K.U.=500 centipoise.

The high viscosity for screen printing ink is achieved by the addition of 1 to 5%, and preferably 1.8 to 2.5%, weight of a water soluble thickening agent. A carboxylated acrylic co-polymer is ideally suited as a thickening agent because it will not alter the other desirable properties of the coating composition, especially its high gloss.

The screen printing ink prepared according to this invention has in addition to the other properties of the basic coating composition excellent adhesion to various surfaces, such as wood, metals, glass, plastic and textiles.

The coating compositions of this invention are generally prepared in the following manner. Selected pigments are blended with water, part of the alkyd resin responsible for gloss, the co-solvents and base. The mixture is subjected to high speed dispersion. It is then ground in a sandmill to a fineness of 7+ on a grind gauge, such as a Hegman Grind Gauge, having a range of 0 to 7. The resulting product is a thick paste.

The paste is combined with a mixture of the remaining alkyds, water, base and drying agents. This mixture is subjected to dispersion. The product is an aqueous dispersion ready for canning.

The following are examples of specific preparations of the compositions of this invention.

EXAMPLE 1

Preparation of #780 Gloss White Bulletin Enamel

The following components were combined in a 60 gallon vessel: 32.5 pounds (lbs.) of vinyltoluene alkyd; 80 fluid ounces (oz.) of ethylene glycol mono n-butyl ether; and 40 oz. of 29% aqua ammonia solution, 20 lb. of water, and 125 lb. white titanium dioxide pigment. The mixture was dispersed for ten minutes at high speed (10) with a Hockmeyer Disperser. The mixture was ground to fineness in a sandmill.

A second mixture was prepared consisting of 47 lbs. of isophthalic acid alkyd, 20 lbs. of the remaining vinyltoluene alkyd, 74 lbs. water, 0.82 lbs. or 16 ounces (oz.) of PATCOTE 531 Defoamer, 4.81 lbs. or 80 oz. of ammonium hydroxide, 0.23 lbs. Cobalt Hydro-Cure, and 0.90 lbs. of Manganese Hydro-Cure.

The first mixture was lowered into the second mixture and dispersed at high speed. The product yield was 30 gallons of enamel.

EXAMPLE 2

Preparation of #756 Brilliant Blue Bulletin Enamel

In a 60 gallon vessel were added 16.25 lbs. of vinyltoluene alkyd, 40 oz. of ethylene glycol mono n-butyl ether, 20 oz. of 20% aqua ammonia and 16.5 lbs. of water. To this mixture the following pigments were added: 2.75 lbs. white, 1.75 lbs. BT-336-D blue, 3.65 lbs. of BT-427-D blue and 1 lb. of carmine. The mixture was dispersed and the product ground as in Example 1.

The mixture was let down directly from the sandmill into a second mixture. This latter mixture contained 34 lbs. of isophthalic acid alkyd, 20 lbs. of vinyltoluene alkyd, 48 lbs. of water, 3 lbs. of triethyl amine, 0.23 lbs. of Colbalt Hydro-Cure, 0.45 lbs. of Manganese Hydrocure, and 0.61 lbs. of PATCOTE 531 Defoamer.

After a final ten minutes of dispersing, 24 gal. of product was produced.

The characteristics of the composition of this invention and its suitability for commercial sign painting appear in Table II.

TABLE II

|  | Brushing Ease (10 for best) |
| --- | --- |
| Dry Time |  |
| Set = 1 to 2 hrs. | General Index = 9 |
| Through = 4 to 6 hrs. | Brush marking = 10, excellent |
| Hard = 10 to 14 hrs. | Sag Index = 9 |
| Scrubability General Grind = 7+ |  |
| At 1000 cycles = excellent | Gloss, 60 deg. = 93 to 101 |
| Recoating Critical Period |  |
| metal = 6 to 25 hrs. | Viscosity = 85 KU |
| wood = 10 to 20 hrs. | Total NV (by Wt.) = 48% |

Toxicity, FDA Status, and Safe Handling
(1) No particular hazard in industrial use, and presents no unusual fire hazard.
(2) D.O.T. Classification: non-flammable and non-hazardous.
(3) Since it does not contain prohibited substances, approval by FDA for food contact applications is possible upon presentation of proper petition.

EXAMPLE 3

Preparation of #706 Carmine Bulletin Enamel

The following components were combined in a 60 gallon vessel: 17 pounds (lbs.) of longchain vinyltoluene alkyd; 17 lbs. of water; 20 fluid ounces (oz.) of 29% aqua ammonia solution; 40 oz. of propylene glycol monopropyl ether; 17–25 lbs. of 45-370 molybdate orange; 6 lbs. of Rt. 795D Violet; and 9 lbs. of ASP200 aluminum silicate. The mixture was dispersed for ten (10) minutes at high speed with a Hockmeyer Disperser. Then the mixture was transferred to a sandmill, "Red Head" Model #3-P, and the mixture was ground to fineness.

A second mixture was prepared consisting of 17 lbs. shortchain vinyltoluene alkyd; 17 lbs. of water; 60 oz. of 29% aqua ammonia solution; 8 oz. of Cobalt drier; 16 oz. of Manganese drier; and 38 oz. of ethylene glycol monopropyl ether.

The first mixture was lowered into the second mixture and dispersed at high speed. The product yield was 145 gallons.

The characteristics of Example 3 appear in Table III.

TABLE III

| #706 Carmine | |
| --- | --- |
| Weight/Gallon = 7.6 lbs. | General Grind = 7+ |
| Viscosity = 90 K.U. | Gloss at 60 deg. = 98 |
| Dry Time | Brushing Ease (10 for best) |
| Set = ¼ to ½ hrs. | General Index = 9 |
| Through = 2 to 3 hrs. | Brush marking = 10, excellent |
| Hard = 5 hrs. | Sag Index = 9 |
| Scrubability (test for adherence properties) | |
| At 1000 cycles = excellent. | |

EXAMPLE 4

Preparation of #806 Carmine Screen Printing Ink

In a 60 gallon vessel were added 14.5 gallons of 706 Carmine Bulletin Enamel (the finished product from Example 3) and 2.34 lbs. of carboxylated acrylic co-polymer. The mixture was dispersed for ten minutes at medium speed (6) with a Hockmeyer Disperser. The product yield was 15 gallons.

The general properties of #806 Carmine Screen Printing Ink are similar to those of #706 Carmine Bulletin Enamel, set forth in Table III above; except that the viscosity of #806 is 140 K.U.

The composition of this invention was developd to meet the special problems of commercial sign painting. However, it has proven to have many other uses in addition to sign painting and screen printing inks.

Water base spray paints have previously been unavailable, but it has been discovered that the composition of this invention is a suitable spray paint when diluted with water so that the composition is from 20 to 60%, and preferably 25 to 30% by volume water.

The water base spray paint of this invention is superior to oil base spray paints in a number of ways. Although it requires no primers, it has excellent adhesion to a variety of surfaces, such as wood, paper, metal, cement. It is non-flammable, non-toxic and non-polluting. These characteristics are particularly valuable given the nature of spray applications.

I claim:

1. A water-base coating composition comprising:
    (a) 20 to 65% by weight water;
    (b) 20 to 75% by weight of at least two vinyltoluene co-polymers containing safflower oil fatty acid, isophthalic acid polyester and trimellitic acid;
    (c) 1 to 10% by weight of a basic solution having a pH of 7.8 to 10.5;
    (d) 0.5 to 5% by weight co-solvent A which is selected from the group consisting of isopropyl alcohol, butanol and glycol ether;
    (e) 0.5% to 5% by weight co-solvent B which is a different glycol ether;
    (f) 0.1 to 1.6% by weight water soluble drying agents; and
    (g) pigments.

2. A water-base coating composition according to claim 1 comprising:
    (a) 28 to 35% by weight water;
    (b) 28 to 35% by weight of at least two vinyltoluene co-polymers containing safflower oil fatty acid, isophthalic acid polyester and trimellitic acid;
    (c) 2.5 to 5.5% by weight of a basic solution having a pH of 8.0 to 8.5;

(d) 1.5 to 2.5% by weight co-solvent A which is selected from the group consisting of isopropyl alcohol, butanol and glycol ether;
(e) 1.5 to 2.5% by weight co-solvent B which is a different glycol ether;
(f) 0.75 to 1.5% by weight water soluble drying agents; and
(g) pigments.

3. A composition according to claim 1 or 2 in which there is added 1 to 5% by weight of a water soluble thickening agent.

4. A composition according to claim 3 in which there is added 1.8 to 2.5% by weight of a water soluble thickening agent.

5. A composition according to claim 4 in which the thickening agent is a carboxylated acrylic co-polymer.

6. A composition according to claim 2 in which one co-polymer has a longer carbon chain and a higher molecular weight than the second co-polymer.

7. A composition according to claim 6 in which there are two co-polymers in a ratio of approximately 1:1.

8. A composition according to claim 6 in which the basic solution is aqua ammonia.

9. A composition according to claim 6 in which the basic solution is an amine.

10. A composition according to claim 9 in which the amine is triethylamine.

11. A composition according to claim 2 in which co-solvent A is a glycol ether.

12. A composition according to claim 11 in which the glycol ether is ethylene glycol monoethyl ether.

13. A composition according to claim 11 in which the glycol ether is ethylene glycol monopropyl ether.

14. A composition according to claim 11 in which the glycol ether is ethylene glycol monobutyl ether.

15. A composition according to claim 2 in which co-solvent B is propylene glycol monopropyl ether.

16. A composition according to claim 2 in which one drying agent is a Cobalt water base drier.

17. A composition according to claim 2 in which the second drying agent is selected from the group consisting of manganese, zirconium and calcium.

18. An improved method of commercial sign painting wherein the improvement lies in the application of a water-base coating composition comprising:
(a) 20 to 65% by weight water;
(b) 20 to 75% by weight of at least two vinyltoluene co-polymers containing safflower oil fatty acid, isophthalic acid polyester and trimellitic acid;
(c) 1 to 10% by weight of a basic solution having a pH of 7.8 to 10.5;
(d) 0.5 to 5% by weight co-solvent A which is selected from the group consisting of isopropyl alcohol, butanol and glycol ether;
(e) 0.5 to 5% by weight co-solvent B which is a different glycol ether;
(f) 0.1 to 1.6% by weight water soluble drying agents; and
(g) pigments.

19. An improved method of commercial sign painting according to claim 18 wherein the improvement lies in the application of a water-base coating composition comprising:
(a) 28 to 35% by weight water;
(b) 28 to 35% by weight of at least two vinyltoluene co-polymers containing safflower oil fatty acid, isophthalic acid polyester and trimellitic acid;
(c) 2.5 to 5.5% by weight of a basic solution having a pH of 8.0 to 8.5;
(d) 1.5 to 2.5% by weight co-solvent A which is selected from the group consisting of isopropyl alcohol, butanol and glycol ether;
(d) 1.5 to 2.5% by weight co-solvent B which is a different glycol ether;
(f) 0.75 to 1.5% by weight water soluble drying agents; and
(g) pigments.

20. A method according to claim 19 in which one co-polymer has a longer carbon chain and a higher molecular weight than the second co-polymer.

21. A method according to claim 20 in which there are two co-polymers in a ratio of approximately 1:1.

22. A method according to claim 20 in which the basic solution is aqua ammonia.

23. A method according to claim 20 in which the basic solution is an amine.

24. A method according to claim 23 in which the amine is triethylamine.

25. A method according to claim 20 in which co-solvent A is a glycol ether.

26. A method according to claim 25 in which the glycol ether is ethylene glycol monoethyl ether.

27. A method according to claim 25 in which the glycol ether is ethylene glycol monopropyl ether.

28. A method according to claim 25 in which co-solvent B is propylene glycol monobutyl ether.

29. A method according to claim 20 in which a drying agent is a Cobalt water base drier.

30. A method according to claim 20 in which the second drying agent is selected from the group consisting of manganese, zirconium and calcium.

31. An improved method of print screening wherein the improvement lies in the application of a water-base coating composition comprising:
(a) 20 to 65% by weight water
(b) 20 to 75% by weight of at least two vinyltoluene co-polymers containing safflower oil fatty acid, isophthalic acid polyester and trimellitic acid;
(c) 1 to 10% by weight of a basic solution having a pH of 7.8 to 10.5%;
(d) 0.5 to 5% by weight co-solvent A which is selected from the group consisting of isopropyl alcohol, butanol and glycol ether;
(e) 0.5 to 5% by weight co-solvent B which is a different glycol ether;
(f) 0.1 to 1.6% by weight water soluble drying agents; and
(g) 1 to 5% by weight of a water soluble thickening agent; and
(h) pigments.

32. An improved method of print screening according to claim 31 wherein the improvement lies in the application of water-base coating composition comprising:
(a) 28 to 35% by weight water;
(b) 28 to 35% by weight of at least two vinyltoluene co-polymers containing safflower oil fatty acid, isophthalic acid polyester and trimellitic acid;
(c) 2.5 to 5.5% by weight of a basic solution having a pH of 8.0 to 8.5;
(d) 1.5 to 2.5% by weight co-solvent A which is selected from the group consisting of ispropyl alcohol, butanol and glycol ether;
(e) 1.5 to 2.5% by weight co-solvent B which is a different glycol ether;

(f) 0.75 to 1.5% by weight water soluble drying agents; and
(g) 1.8 to 2.5% by weight of a water soluble thickening agent; and
(h) pigments.

33. A method according to claim 32 in which the thickening agent is a carboxylated acrylic co-polymer.

34. A method according to claim 32 in which one co-polymer has a longer carbon chain and a higher molecular weight than the second co-polymer.

35. A method according to claim 32 in which there are two co-polymers in a ratio of approximately 1:1.

36. A method according to claim 32 in which the basic solution is aqua ammonia.

37. A method according to claim 32 in which the basic solution is an amine.

38. A method according to claim 37 in which the amine is triethylamine.

39. A method according to claim 32 in which co-solvent A is a glycol ether.

40. A method according to claim 39 in which the glycol ether is ethylene glycol monoethyl ether.

41. A method according to claim 39 in which the glycol ether is ethylene glycol monopropyl ether.

42. A method according to claim 32 in which co-solvent B is propylene glycol monobutyl ether.

43. A method according to claim 32 in which a drying agent is a Cobalt water base drier.

44. A method according to claim 32 in which the second drying agent is selected from the group consisting of manganese, zirconium and calcium.

45. An improved method of spray painting wherein the improvement lies in the application of a 20 to 60% by volume water dilution of a water-base composition comprising:
(a) 20 to 65% by weight water;
(b) 20 to 75% by weight of at least two vinyltoluene co-polymers containing safflower oil fatty acid, isophthalic acid polyester and trimellitic acid;
(c) 1 to 10% by weight of a basic solution having a pH of 7.8 to 10.5;
(d) 0.5 to 5% by weight co-solvent A which is selected from the group consisting of isopropyl alcohol, butanol and glycol ether;
(e) 0.5% to 5% by weight co-solvent B which is a different glycol ether;
(f) 0.1 to 1.6% by weight water soluble drying agents; and
(g) pigments.

46. An improved method of spray painting wherein the improvement lies in the application of a 25 to 30% by volume water dilution of a water-base coating composition comprising:
(a) 28 to 35% by weight water;
(b) 28 to 35% by weight of at least two vinyltoluene co-polymers containing safflower oil fatty acid, isophthalic acid polyester and trimellitic acid;
(c) 2.5 to 5.5% by weight of a basic solution having a pH of 8.0 to 8.5;
(d) 1.5 to 2.5% by weight co-solvent A which is selected from the group consisting of isopropyl alcohol, butanol and glycol ether;
(e) 1.5 to 2.5% by weight co-solvent B which is a different glycol ether;
(f) 0.75 to 1.5% by weight water soluble drying agents; and
(g) pigments.

* * * * *